United States Patent Office 3,284,267
Patented Nov. 8, 1966

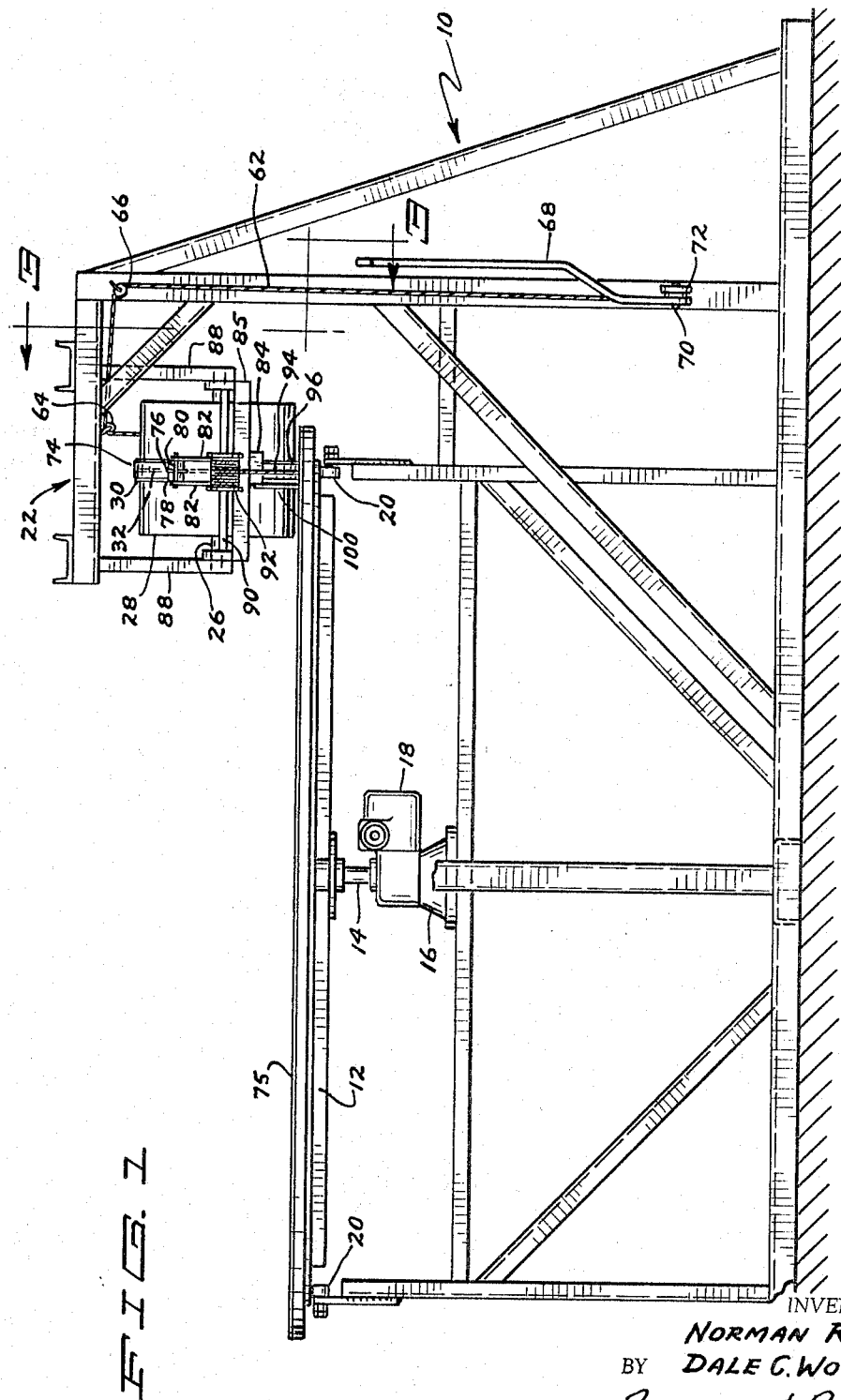

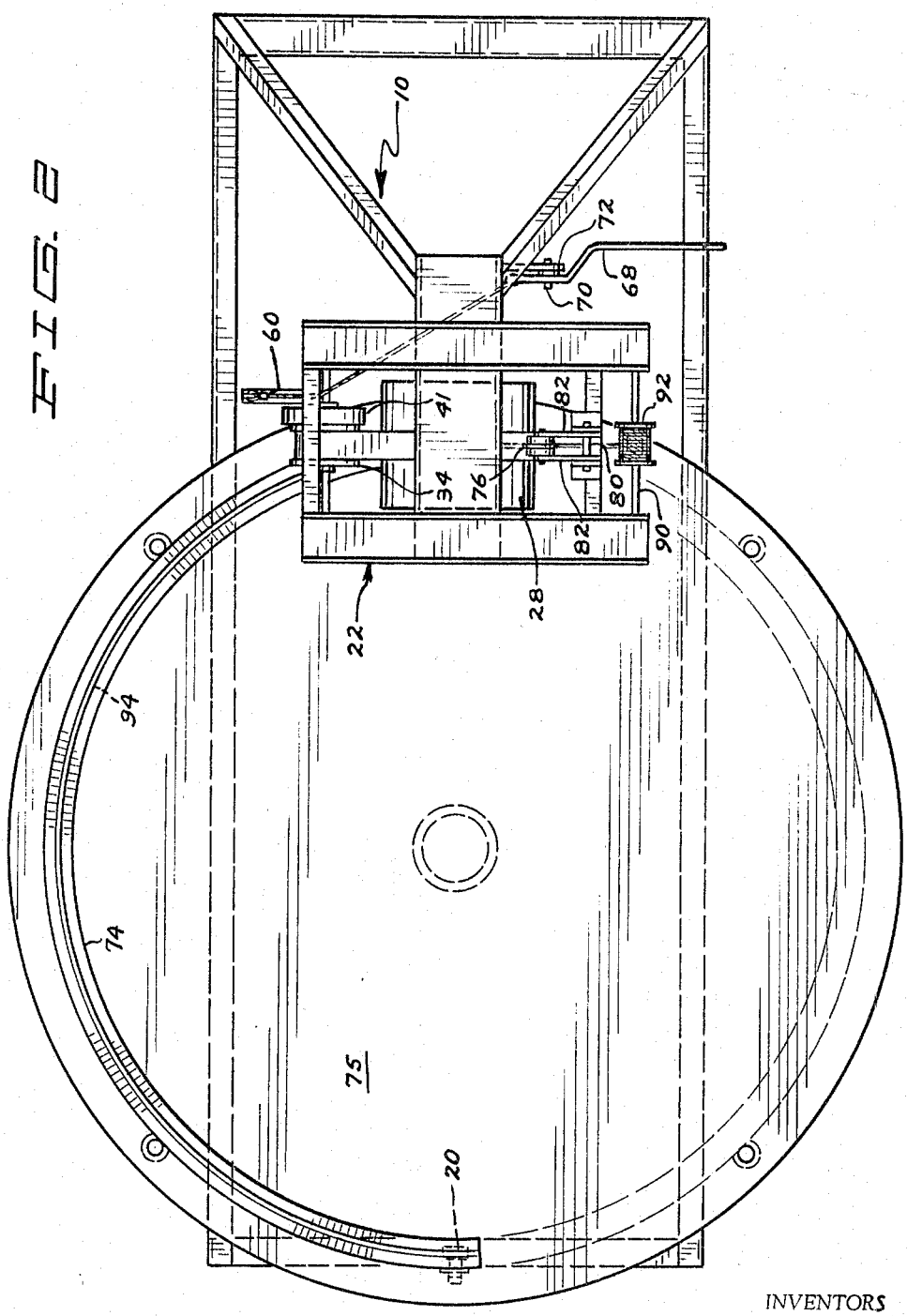

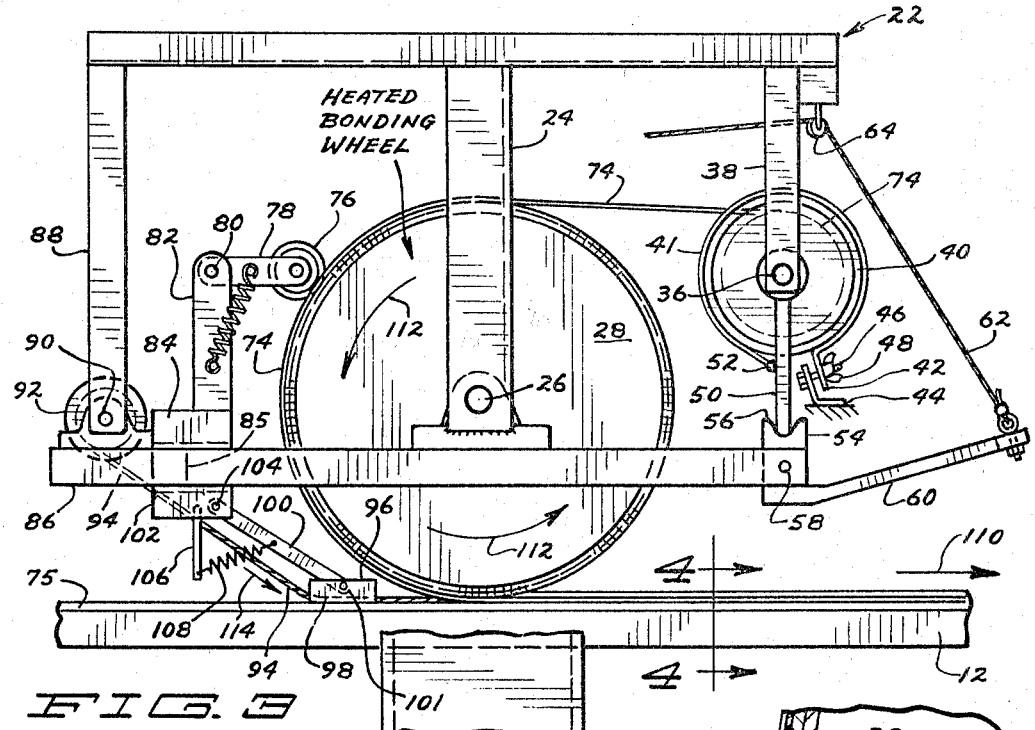
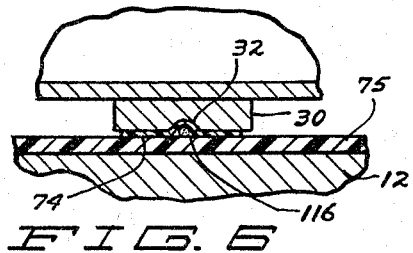
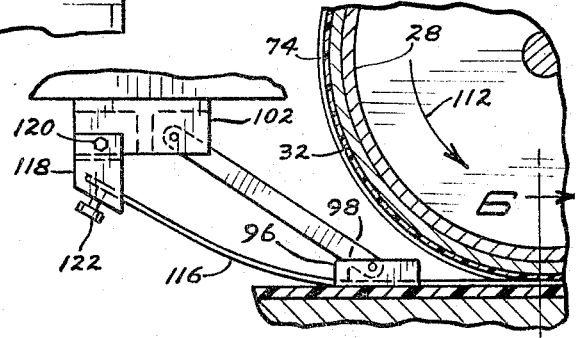
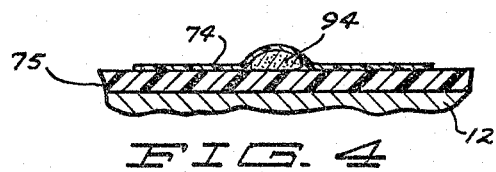

3,284,267
APPARATUS FOR SEALING AND FORMING A TUNNEL WITH HEAT-SEALABLE TAPE
Norman R. Buck, Northfield, and Dale C. Wood, Farmington, Minn., assignors to G. T. Schjeldahl Company, Northfield, Minn., a corporation of Minnesota
Filed Dec. 26, 1961, Ser. No. 162,112
6 Claims. (Cl. 156—383)

This invention relates generally to heat sealing apparatus and pertains more particularly to apparatus of this type for forming a tunnel between a tape and the sheet of material to which the tape is being adhered.

One object of the invention is to provide apparatus that will form a tunnel or passage between two pieces of material, at least one of which is flexible. The invention has for an aim the depositing of a cord within the tunnel as it is formed with the flexible material during the sealing procedure, or the tunnel may be left empty of material for insertion of a suitable cord or other material at a later time. While the apparatus can be employed in the making of a variety of articles, it will possess especial utility in the fabrication of plastic covers or diaphragms where a hem-like border is needed, the tunnel constituting the border accommodating a draw string, wire, primer fuse or the like which is either inserted as the tunnel is formed or thereafter as indicated above.

Another object is to provide apparatus that will perform its task quickly. In this regard, the invention has for a feature the forming of the tunnel at the same time the tape is sealed.

Another object of the invention is to precrease or slightly indent the tape to assist in the subsequent formation of the tunnel.

A still further object of the invention is to provide apparatus in which the tunnel will be properly located with respect to the edge of the tape. Therefore, it is within the contemplation of the invention to provide a guiding or centering action for the rod-like element which is either being deposited in the tunnel or which is merely assisting in the formation of the tunnel in order that material can be added later.

Yet another object of the invention is to provide apparatus capable of making a circular diaphragm in which straight tape is applied to curved or arcuate borders in a manner such that the tape for all intents and purposes remains wrinkle-free.

These and other objects and advantages of this invention will more fully appear from the following description, made in connection with the accompanying drawings, wherein like reference characters refer to the same or similar parts throughout the several views and in which:

FIGURE 1 is a front elevational view showing one embodiment our heat sealing apparatus may assume;

FIGURE 2 is a top plan view of the apparatus depicted in FIGURE 1;

FIGURE 3 is a fragmentary side elevational view, considerably enlarged, illustrating more clearly the manner in which the tunnel is formed with the apparatus pictured in FIGURES 1 and 2;

FIGURE 4 is a sectional view taken in the direction of line 4—4 of FIGURE 3, the view showing the tunnel that has been formed with a cord contained therein;

FIGURE 5 is a side elevational view of a portion of the apparatus depicted in FIGURE 3 but with the apparatus modified so as to produce an empty tunnel which will be subsequently filled with a cord or other material, and FIGURE 6 is a sectional view taken in the direction of line 6—6 of FIGURE 5.

Referring now in detail to the drawings, it will be seen that the apparatus there pictured for the purpose of exemplifying the invention comprises a frame structure denoted in its entirety by the reference numeral 10. The frame structure 10 supports a turntable 12 having a vertical shaft 14 projecting downwardly into a gear housing 16. Mounted at one side of the gear housing 16 is a motor 18 for causing rotation of the turntable 12 about a vertical axis provided by the shaft 14. Underlying the turntable 12 interjacent its periphery is a plurality of rollers 20 which function to steady the table during its rotative operation.

Surmounting a peripheral segment of the turntable 12 is an additional framework labeled 22. The framework 22 is actually an integral extension of the frame structure 10. Describing the framework 22 in greater detail, though, it will first be observed that this framework includes a pair of spaced parallel vertical arms denoted by the reference numeral 24 (FIGURE 3). At the lower end of these arms 24 is journaled a shaft 26. The function of the shaft is to rotatably support a heated bonding wheel indicated by the reference numeral 28. The bonding wheel 28 is heated in a conventional fashion by an electric heating means (not shown). However, the bonding wheel 28 is equipped with an annular rim or ring 30 having a circumferential groove 32 (best seen in FIGURE 6) disposed therein. The groove 32 plays an important role which will be better understood as the description progresses.

Attention is directed at this time to the presence of a reel 34 rotatably mounted on a transverse shaft or axle 36 carried between two downwardly projecting arms 38. These arms may be considered to constitute a part of the framework 22. At any rate, it is to be observed that the reel 34 is provided with an integral drum 40 at one side which has in an encircling relationship therewith a brake band 41. One end of the brake band is outturned into a radial position at 42 and by reason of a fixed bracket 44 the end 42 can be held in a fast relationship. However, for the purpose of adjustment and compensating for brake wear, a bolt 46 extends through the end 42 and the bracket 44, as best seen in FIGURE 3, and has a wing nut 48 threadedly received thereon so that the adjustment can be made. A radial arm 50 has the other end of the brake band 41 anchored thereto at 52. Hence, the degree of braking action can be initially determined by adjusting the wing nut 48. With a predetermined amount of braking action taking place, it will later be seen that a controlled frictional drag can be imposed upon reel 34.

For the purpose of governing or altering the degree of frictional drag to which the brake drum 40 is subjected is a clevis member 54 having a notch at 56 into which the free end of the radial arm projects. By appropriately pivoting the clevis 54, as by means of a pivot pin 58, the arm 50 can be forcibly moved so as to vary the gripping action of the brake band 41 against the brake drum 40. In the achieving of this aim, it is to be noted that the clevis member 54 is equipped with a rearwardly projecting lever 60 to which a cable 62 is attached. The cable 62 passes over a pair of pulleys 64 and 66 before connecting with an actuating lever 68. The actuating lever 68 is pivotally connected near one end by means of a pivot pin 70 to a lug 72 which is welded or otherwise secured to the frame structure 10.

The reel 34 carries the supply of heat-sealable tape 74. From FIGURE 3 it will be discerned that the tape 74 is withdrawn from the reel 34 in a substantially horizontal direction, passing about one-half of the circumference of the heated bonding roller 28 before being pressed by the wheel 28 against a sheet of plastic material 75 that has been placed on the turntable 12. As with the heat-sealable tape 74, the plastic sheet 75 is also preferably heat-sealable. Various thermoplastic materials are available and are in common usage. For instance, the tape 74 and the sheet 75 may be Mylar. However, other materials can be utilized.

It has already been mentioned that the annular ring or rim 30 is formed with a circumferential groove 32. For the purpose of urging the tape 74 into the groove 32 after the tape has been to some extent heated by the wheel 28, there is an auxiliary wheel 76 suitably shaped at its periphery so as to complement, and thus fit into, the groove 32. The auxiliary wheel 76 is rotatably carried at one end of a pivotal link 78, there being a pin 80 providing the pivotal connection to the upper end of a post 82. The post 82 may be suitably mounted in a vertical or upright position, a block 84 having been shown which is affixed to the central portion of a transverse member 85. The transverse member 85 extends between two horizontal members 86 which are suspended from the shaft 26, these members 86 also serving to support the previously mentioned pivotal clevis member 54.

At the forward side of the framework 22 is an additional pair of downwardly projecting arms 88, these arms carrying a transverse shaft 90 at their lower ends which in turn rotatably supports a reel 92. The reel 92 carries a supply of cord labeled 94. The term cord is used rather generically, it being intended to embrace a variety of rod-like elements such as draw strings, wire, fuse primers and the like.

Whereas the cord 94 is payed from the reel 92, it will be seen that such a flexible element requires guiding in order to be suitably fed between the tape 74 and the sheet 75. In the accomplishment of the guiding function, a guide block 96 is employed. On the lower face of the guide block 96 is formed a longitudinal groove 98 having a cross-sectional configuration similar to that of the groove 32. The guide block 96 is pivotally carried at the lower end of an angularly disposed arm 100 by means of a pivot pin 101. The upper end of the arm 100 is pivotally attached to a block 102 affixed to the transverse member 85, the pivotal connection being through the agency of a pivot pin 104. It will be noted that the block 102 carries a downwardly projecting rigid finger 106 and that a coil spring 108 extends between the finger 106 and the arm 100 so as to bias the arm 100 in a clockwise direction as viewed in FIGURE 3, thereby urging the guide block 96 downwardly into firm engagement with the sheet 75 disposed on the turntable 12.

Having presented the foregoing information, the operation of our heat sealing apparatus should be readily apparent. Briefly, what occurs is that as the turntable 12 is rotated by the motor 18 the sheet of plastic material 75, which in the present instance is of circular configuration, has its border or marginal edge moved under the heated bonding wheel 28. The direction of movement of the turntable 12 and its superimposed sheet 75 is indicated by the arrow 110 in FIGURE 3. Owing to the fact that the wheel 28 presses the tape 74 downwardly, the wheel 28 is caused to rotate in the direction of the arrows 112, these arrows appearing likewise in FIGURE 3. The driven rotation of the wheel 28 in turn causes the tape 74 to be withdrawn from its reel 34. As the tape 74 engages the bonding wheel 28, it starts to become heated and becomes progressively more plastic as it passes about the periphery of the wheel 28. By the time that the tape 74 reaches the auxiliary wheel 76, it has been heated to some extent, therefore becoming more pliable, and the pressure of the auxiliary wheel 76 is instrumental in pre-creasing or forcing the tape 74 intermediate its side edges into the groove 32.

By reason of the pre-casting action supplied by the auxiliary wheel 76, the cord 94 can be received readily between the tape 74 and the underlying sheet 75 subjacent the bonding wheel 28. In other words, the cord 94 is fed tangentially between the tape 74 and the sheet 75, being moved in the direction of the arrow 114 in FIGURE 3.

Thus, as the turntable 12 moves relative to the bonding wheel 28, more and more cord 94 is pulled from the reel 92 and it is deposited in what amounts to a tube that is provided by reason of the circumferential groove 32. The guide block 96, of course, by virtue of its groove 98, assures that the cord is fed into registry with the groove 32 of the wheel 28. It is important to appreciate that the cord 94 in the embodiment now being discussed is placed between the tape 74 and the sheet 75 to form a tunnel and at the same time the marginal edges of the tape 74 are adhered to the underlying portions of the sheet 75. However, no adherence takes place in the region of the cord 94 which is fed between the tape 74 and the sheet 75.

Whereas the tunnel formed with the embodiment specifically disclosed in FIGURES 1–4 results in the rod-like element or cord 94 being left in the tunnel formed between the tape 74 and the sheet 75, it is recognized that there will be situations where the tunnel should be left empty. Accordingly, provision is made for modifying the apparatus to the extent that an empty tunnel can be provided. With this in mind, attention is now called to FIGURE 5. In this figure, a plastic rod 116, such as nylon, has one end portion disposed in the groove 98 of the guide block 96. The upper or other end portion however is carried by a U-shaped bracket 118 having clamping bolts 120 for the purpose of engaging opposite sides of the block 102 to which the pivotal arm 100 is attached. The bracket 118 is formed with a solid portion which is apertured for the reception of the upper end of the rod 116, a thumb screw 122 bearing against the received end so as to anchor the rod 116.

In operation, it will be understood that the rod 116 of FIGURE 5 is held in a fixed relationship with the framework 22. Stated somewhat differently, the rod 116 does not move relative to the heated bonding wheel 28. However, there is relative movement that takes place between the rod 116 and the turntable 12. Consequently, the free end of the rod 116 is in effect continually withdrawn from the tunnel that is formed by the pressing action of the bonding wheel 28 against the tape 74. Hence, the tape 74 is constantly withdrawn from the supply reel 34 and is adhered to the sheet 75 in the same manner that the sealing action occurs in the earlier-described embodiment. However, owing to the relative movement of the rod 116 with respect to the turntable 12 and also with respect to the sheet 75, the rod 116 is in effect dragged along with respect to the tunnel that is being formed.

Although the turntable 12 in the drawings has been considered as the movable member, it will be appreciated that only relative movement between the turntable 12 and the superimposed bonding wheel 28 is needed. Hence, the table 12 can remain stationary in certain instances and the bonding wheel 28 instead can be moved relative thereto such as by mounting the wheel 28 on a suitable carriage that is movable with respect to the table.

It will, of course, be understood that various changes may be made in the form, details, arrangements and proportions of the parts without departing from the scope of this invention as set forth in the appended claims.

What is claimed:
1. Flexible material applying apparatus comprising:
 (a) a table for supporting a flat piece of material, said table being rotatable about a first axis,
 (b) a rotatable bonding wheel for pressing a flexible piece of material against one side of said first piece of material to establish a bond between said materials along certain predetermined portions thereof said bonding wheel being rotatable about a second axis substantially at right angles to said first axis,
 (c) means for moving said table and bonding wheel relative to each other, and

(d) means for inserting a rod-like element along median portions spaced from the edges of said flexible material and between said pieces of material to prevent adherence of said material pieces to each other and to said element in the region of said element to produce a tunnel.

2. Heat sealing apparatus comprising:
(a) a table for supporting a sheet of plastic material, said table being supported for rotation about a first axis.
(b) a heated bonding wheel provided with a circumferential groove said bonding wheel being supported for rotation about a second axis substantially at right angles to said first axis,
(c) means for moving said table and bonding wheel relative to each other,
(d) means for holding a supply of heat sealable tape and for paying out a strip of said tape so that said tape passes about a segment of said wheel in order for at least portions thereof to be heated and then presssed against said sheets of plastic material,
(e) means for inserting a rod-like element along a center portion spaced from the edges of said tape and between said tape and sheet material to prevent contact of the said center portion of said tape and said sheet material, and
(f) means for guiding said rod-like element into tangential alignment with the groove of said wheel.

3. Heat sealing apparatus comprising:
(a) a frame structure,
(b) a turntable mounted on said frame structure for rotation about a vertical axis, said turntable having a flat horizontal surface for the support of a sheet of plastic material,
(c) a heated bonding wheel mounted for rotation about a horizontal axis above said turntable, said bonding wheel having a circumferential groove,
(d) a supply reel mounted on said frame structure for paying out a strip of heat sealable tape so that said tape passes about an upper segment of said bonding wheel and then beneath said wheel in order to be presssed against said sheet material,
(e) an auxiliary wheel mounted on said frame structure at an elevation so as to bear against said tape after it has passed part way around said bonding wheel to flex a central portion of said tape into said groove,
(f) a guide block having a longitudinal groove formed on its underside,
(g) means mounting said guide block on said frame structure so that its groove is parallel to the horizontal surface of said turntable and in tangential alignment with said circumferential groove, and
(h) means carried on said frame structure for directing a flexible elongated element into the groove of said guide block whereby said elongated element enters between said tape and sheet to prevent adherence of said tape to said elongated element and to said sheet in the region of said elongated element and thus form a tunnel.

4. Heat sealing apparatus in accordance with claim 3 in which said last-mentioned means includes a reel and said elongated element constitutes a roll of cord material that is payed out and deposited in said tunnel as said turntable rotates.

5. Heat sealing apparatus in accordance with claim 3 in which said last-mentioned means includes a mounting block and said elongated element constitutes a resilient plastic rod that is held stationary by said frame structure as said turntable rotates.

6. Heat sealing apparatus in accordance with claim 3 further comprising braking means on said supply reel for imparting tension to said tape.

References Cited by the Examiner

UNITED STATES PATENTS

| | | | |
|---|---|---|---|
| 2,061,922 | 11/1936 | Ross | 156—436 |
| 2,593,090 | 4/1952 | Bartosy | 156—436 |
| 2,690,104 | 9/1954 | Schwartz et al. | 156—583 |
| 3,082,292 | 3/1963 | Gore | 156—179XR |
| 3,158,181 | 11/1964 | Gore | 156—292XR |

EARL M. BERGERT, *Primary Examiner.*

R. I. SMITH, M. L. KATZ, *Assistant Examiners.*